(12) United States Patent
Lee et al.

(10) Patent No.: US 9,859,566 B2
(45) Date of Patent: Jan. 2, 2018

(54) RECHARGEABLE SECONDARY BATTERY

(71) Applicant: SAMSUNG SDI CO., LTD., Yongin-si, Gyeonggi-do (KR)

(72) Inventors: Junyong Lee, Yongin-si (KR); Seungyeol Yoo, Yongin-si (KR); Huijun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 757 days.

(21) Appl. No.: 14/264,971

(22) Filed: Apr. 29, 2014

(65) Prior Publication Data

US 2015/0111091 A1    Apr. 23, 2015

(30) Foreign Application Priority Data

Oct. 23, 2013  (KR) .......................... 10-2013-0126566

(51) Int. Cl.
| | |
|---|---|
| *H01M 4/66* | (2006.01) |
| *H01M 2/26* | (2006.01) |
| *H01M 10/04* | (2006.01) |
| *H01M 2/16* | (2006.01) |

(52) U.S. Cl.
CPC .............. *H01M 4/66* (2013.01); *H01M 2/16* (2013.01); *H01M 2/1653* (2013.01); *H01M 2/26* (2013.01); *H01M 10/04* (2013.01); *H01M 10/0413* (2013.01); *H01M 10/0436* (2013.01); *H01M 10/0463* (2013.01); *H01M 2200/00* (2013.01)

(58) Field of Classification Search
USPC ........................................................ 429/161
See application file for complete search history.

(56) References Cited

U.S. PATENT DOCUMENTS

| | | | | |
|---|---|---|---|---|
| 8,501,341 B2 * | 8/2013 | Byun | ...................... | H01M 2/22 429/161 |
| 8,748,030 B2 * | 6/2014 | Byun | .................... | H01M 2/345 429/161 |
| 2003/0099880 A1 * | 5/2003 | Park | ........................ | H01M 2/26 429/211 |
| 2004/0128826 A1 | 7/2004 | Nakanishi et al. | | |
| 2005/0260489 A1 | 11/2005 | Kim | | |

(Continued)

FOREIGN PATENT DOCUMENTS

| | | |
|---|---|---|
| EP | 1 096 582 A1 | 5/2001 |
| EP | 1 744 393 A2 | 1/2007 |

(Continued)

OTHER PUBLICATIONS

KIPO Office Action dated Sep. 22, 2016 for corresponding Korean Patent Application No. 10-2013-126566, (8 pages).

(Continued)

*Primary Examiner* — Rena D Cronin
(74) *Attorney, Agent, or Firm* — Lewis Roca Rothgerber Christie LLP

(57) ABSTRACT

A rechargeable secondary battery including: a case; an electrode assembly accommodated in the case, the electrode assembly including an active material coating portion and an active material non-coating portion; a light absorbing member coupled to the electrode assembly; and a collector plate welded to the electrode assembly and contacting the active material non-coating portion.

20 Claims, 9 Drawing Sheets

(56) References Cited

U.S. PATENT DOCUMENTS

| | | | | |
|---|---|---|---|---|
| 2005/0287431 | A1* | 12/2005 | Cho | H01M 2/06 429/161 |
| 2006/0093922 | A1* | 5/2006 | Kim | C09J 7/0264 429/251 |
| 2006/0115722 | A1* | 6/2006 | Kim | H01M 2/263 429/161 |
| 2007/0105015 | A1* | 5/2007 | Munenaga | H01M 2/0404 429/161 |
| 2012/0183841 | A1* | 7/2012 | Byun | H01M 2/1072 429/163 |

FOREIGN PATENT DOCUMENTS

| | | |
|---|---|---|
| EP | 2 472 642 A2 | 7/2012 |
| JP | 08-115744 | 5/1996 |
| JP | 10-106536 A | 4/1998 |
| JP | 10-255753 A | 9/1998 |
| JP | 2000-133241 A | 5/2000 |
| JP | 2002-075322 A | 3/2002 |
| JP | 2007-250395 A | 9/2007 |
| KR | 10-2005-0110460 A | 11/2005 |
| KR | 10-2012-0078601 A | 7/2012 |
| KR | 10-2012-0082182 A | 7/2012 |
| WO | WO 2009/048303 A2 | 4/2009 |

OTHER PUBLICATIONS

EPO Search Report dated Feb. 5, 2015, for corresponding European Patent application 14183355.8, (3 pages).

Patent Abstracts of Japan, and English machine translation of Japanese Publication 08-115744 dated May 7, 1996, (13 pages).

Notice of Allowance for corresponding Korean patent application No. 10-2013-0126566, filed Oct. 23, 2013, Notice of Allowance dated Mar. 21, 2017 (5 pgs.).

* cited by examiner

RECHARGEABLE SECONDARY BATTERY

CROSS-REFERENCE TO RELATED APPLICATION

This application claims priority to and the benefit of Korean Patent Application No. 10-2013-0126566, filed on Oct. 23, 2013 in the Korean Intellectual Property Office, the entire content of which is incorporated herein by reference.

BACKGROUND

1. Field

Aspects of embodiments of the present invention relate to a rechargeable secondary battery.

2. Description of the Related Art

A rechargeable lithium ion secondary battery may be used, for example, in a small-sized electronic device, such as a notebook computer or a cellular phone. Also, because recently developed rechargeable lithium ion secondary batteries have advantageous characteristics, including high output power, high capacity, and lightness in weight, as compared to other types of rechargeable secondary batteries, they are commonly used in hybrid vehicles and electric vehicles.

In a manufacturing process of the rechargeable secondary battery, a collector plate may be welded to an electrode assembly by laser beam. For example, an active material non-coating portion of the electrode assembly may be inserted into a slit of the collector plate, followed by irradiating a laser beam, thereby electrically connecting the collector plate to the electrode assembly.

However, according to the manufacturing process, since the laser beam is induced to the inside of the active material non-coating portion, a separator and/or an electrode plate are vulnerable to damage and may result in an internal short circuit between electrode plates.

SUMMARY

According to an aspect of embodiments of the present invention, a rechargeable secondary battery can prevent a separator and/or electrode plates from being damaged and can prevent the electrode plates from being internally short circuited by preventing or substantially preventing laser beam and/or spatter from being induced into an active material non-coating portion of an electrode assembly when a collector plate is laser-welded to the electrode assembly.

According to another aspect of embodiments of the present invention, a rechargeable secondary battery can maximize or increase an internal margin (active material coating area) of an electrode assembly by welding a collector plate to an electrode assembly by laser beam in a direction parallel to a lengthwise direction of the electrode assembly, which can simplify a design of the collector plate, and which can reduce the number of manufacturing process steps.

According to one or more embodiments of the present invention, a rechargeable secondary battery includes: a case; an electrode assembly accommodated in the case, the electrode assembly including an active material coating portion and an active material non-coating portion; a light absorbing member coupled to the electrode assembly; and a collector plate welded to the electrode assembly and contacting the active material non-coating portion.

The collector plate may contact the light absorbing member.

The light absorbing member may include an electrical insulator.

A color of the light absorbing member may be black.

The light absorbing member may include a material selected from the group consisting of polypropylene (PP), polyethylene (PE), and ethylene propylene diene monomer (EPDM).

The collector plate may be welded to the active material non-coating portion, and the light absorbing member may be coupled to the active material non-coating portion.

The collector plate may be welded to an end in a lengthwise direction of the active material non-coating portion, and the light absorbing member may be positioned on a side of the active material non-coating portion in a direction perpendicular to the lengthwise direction of the active material non-coating portion.

The light absorbing member may include a first light absorbing member positioned on the side of the active material non-coating portion, and a second light absorbing member positioned on another side of the active material non-coating portion opposite the side of the active material non-coating portion.

The light absorbing member may be positioned at an outermost region of the electrode assembly on the side of the active material non-coating portion.

The light absorbing member may be positioned between the active material coating portion and the collector plate.

According to another embodiment of the present invention, a rechargeable secondary battery includes: a case; an electrode assembly accommodated in the case; a light absorbing member coupled to the electrode assembly; a collector plate welded to the electrode assembly and making close contact with the light absorbing member; and a terminal connected to the collector plate and extending to the outside of the case.

The light absorbing member may be an electrical insulator.

A color of the light absorbing member may be black.

The light absorbing member may be made of one selected from the group consisting of polypropylene (PP), polyethylene (PE) and ethylene propylene diene monomer (EPDM).

The electrode assembly may include an active material coating portion and an active material non-coating portion, the collector plate may be welded to the active material non-coating portion, and the light absorbing member may be coupled to the active material non-coating portion.

The collector plate may be welded to an end in a lengthwise direction of the active material non-coating portion, and the light absorbing member may be positioned in a direction perpendicular to the lengthwise direction of the active material non-coating portion.

The active material coating portion may be separated from the collector plate by the light absorbing member.

The electrode assembly may further include a separator making close contact with the active material coating portion, and the separator may be separated from the collector plate by the light absorbing member.

The collector plate may include a first region connected to the terminal, a second region extending from the first region and welded to an end in a lengthwise direction of the active material non-coating portion of the electrode assembly, and a bent region formed between the first region and the second region.

The active material non-coating portion may include a first region parallel to the lengthwise direction of the active material coating portion, a second region perpendicular to a widthwise direction of the collector plate, and a bent region formed between the first region and the second region.

The collector plate may have a width extending perpendicular to the lengthwise direction of the electrode assembly.

The electrode assembly may include a first electrode plate including a first coating portion and a first non-coating portion, a second electrode plate including a second coating portion and a second non-coating portion, and a separator disposed between the first and second electrode plates, wherein the light absorbing member includes: a first light absorbing member coupled to the first non-coating portion, and a second light absorbing member coupled to the second non-coating portion.

When the collector plate and the electrode assembly are laser-welded to each other, the first light absorbing member may prevent or substantially prevent the laser beam from being induced to the first coating portion of the first electrode plate, the second coating portion of the second electrode plate, and the separator.

When the collector plate and the electrode assembly are laser-welded to each other, the second light absorbing member may prevent or substantially prevent the laser beam from being induced to the first coating portion of the first electrode plate, the second coating portion of the second electrode plate, and the separator.

As described above, according to an aspect of embodiments of the present invention, in the rechargeable secondary battery, since the light absorbing member having a high light absorption coefficient is interposed between active material non-coating portions in the electrode assembly, it is possible to prevent a separator and/or electrode plates from being damaged and can prevent the electrode plates from being internally short circuited by preventing or substantially preventing laser beam and/or spatter from being induced into an active material non-coating portion of an electrode assembly when a collector plate is laser-welded to the electrode assembly.

According to another aspect of embodiments of the present invention, the rechargeable secondary battery has a maximized or increased internal margin (active material coating area) of an electrode assembly by welding a collector plate to an electrode assembly by laser beam in a direction parallel to a lengthwise direction of the electrode assembly, rather than in a direction perpendicular to the lengthwise direction of the electrode assembly. According to another aspect of embodiments of the present invention, a rechargeable secondary battery has a simplified design of a collector plate, and a reduced number of manufacturing process steps.

Additional aspects and principles of the present invention are set forth in the description which follows and, in part, may be obvious from the description, or may be learned by practice of the invention.

BRIEF DESCRIPTION OF THE DRAWINGS

Aspects and features of the present invention will be more apparent from the following detailed description in conjunction with the accompanying drawings, in which:

FIG. 1d is a partial bottom perspective view of an inner portion including a collector plate of the rechargeable secondary battery of FIG. 1a;

Figure 1A:
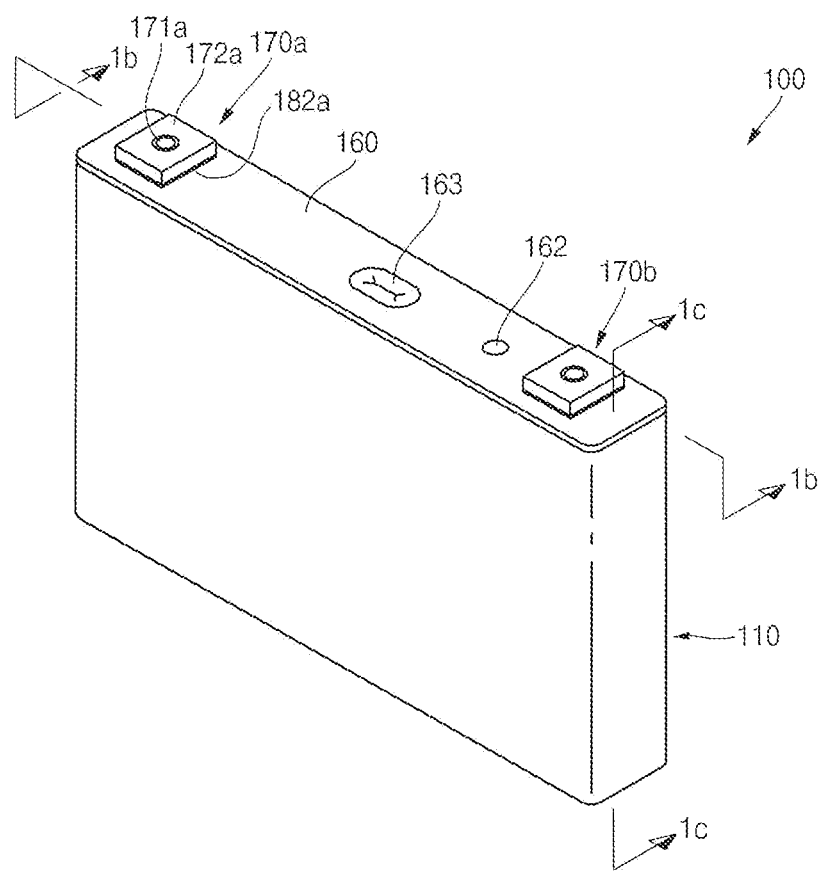
FIG. 1a is a perspective view of a rechargeable secondary battery according to an embodiment of the present invention.

Description of Reference Numerals Indicating Some Elements in the Drawings

| | |
|---|---|
| 100: Secondary battery | 110: Case |
| 120: Electrode assembly | 121: First electrode plate |
| 121a: First non-coating portion | 121b: First electrode collector |
| 121c: First active material | 122: Second electrode plate |
| 122a: Second non-coating portion | 122b: Second electrode collector |
| 122c: Second active material | 123: Separator |
| 130a: First collector plate | 130b: Second collector plate |
| 131a: First region | 132a: Second region |
| 133a: Bent region | 134a: Third region |
| 135a: Fuse hole | 136a: Fuse part |
| 137a, 138a: Coupling hole | 140a: First light absorbing member |
| 140b: Second light absorbing member | 150a: First insulation part |
| 151a: Upper region | 152a: Side region |
| 160: Cap plate | 161: Electrolyte injection hole |
| 162: Plug | 163: Safety vent |
| 170a: First terminal | 170b: Second terminal |
| 171a: Fastened region | 172a: Fixing region |
| 173a: Flange | 174a: Coupling protrusion |
| 181a: Seal gasket | 182a: Upper insulation part |

DETAILED DESCRIPTION

The present invention is described more fully herein with reference to the accompanying drawings, in which some exemplary embodiments of the present invention are shown. As those skilled in the art would realize, the described embodiments may be modified in various different ways, all without departing from the spirit or scope of the present invention. Accordingly, the drawings and description are to be regarded as illustrative in nature and not restrictive.

In the drawings, the thicknesses of layers and regions may be exaggerated for clarity. Like numbers refer to like elements throughout. As used herein, the term "and/or" includes any and all combinations of one or more of the associated listed items.

The terminology used herein is for the purpose of describing some particular exemplary embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers and/or parts, these members, elements, regions, layers and/or parts should not be limited by these terms. These terms may be used merely to distinguish one member, element, region, layer and/or part from another member, element, region, layer and/or part. Thus, for example, a first member, element, region, layer and/or part discussed below could be termed a second member, element, region, layer and/or part without departing from the teachings of the present invention.

Figure 1B:
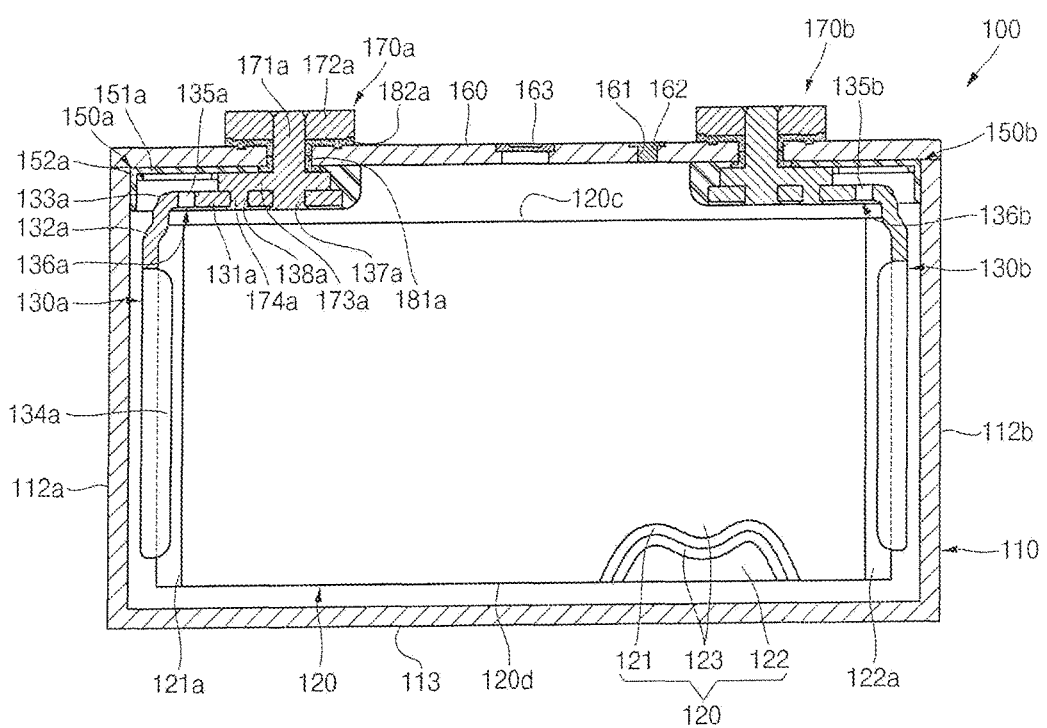
FIG. 1b is a cross-sectional view of the rechargeable secondary battery of FIG. 1a, taken along the line 1b-1b.
Figure 1C:
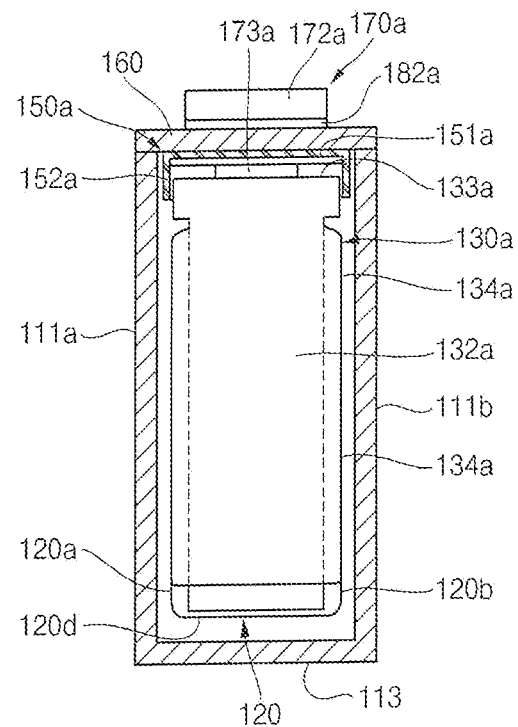
FIG. 1c is a cross-sectional view of the rechargeable secondary battery of FIG. 1a, taken along the line 1c-1c.
Figure 1D:
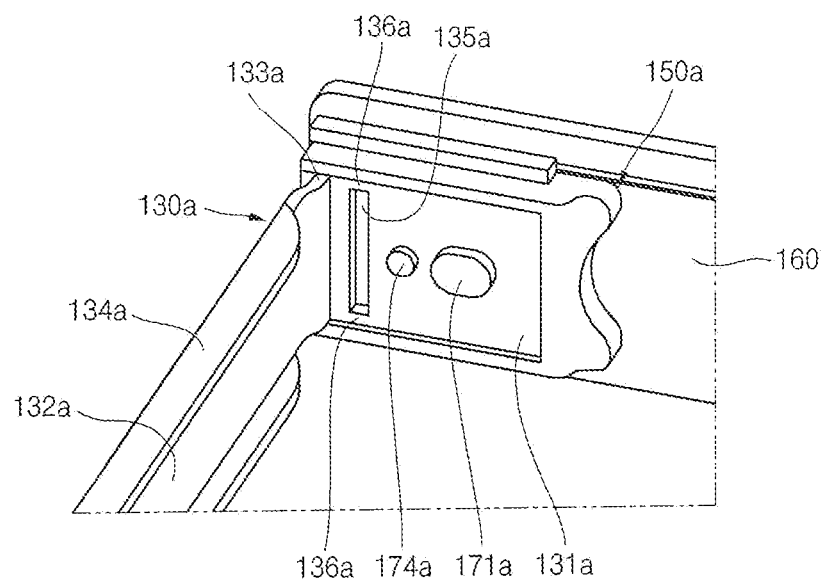
Figure 2:
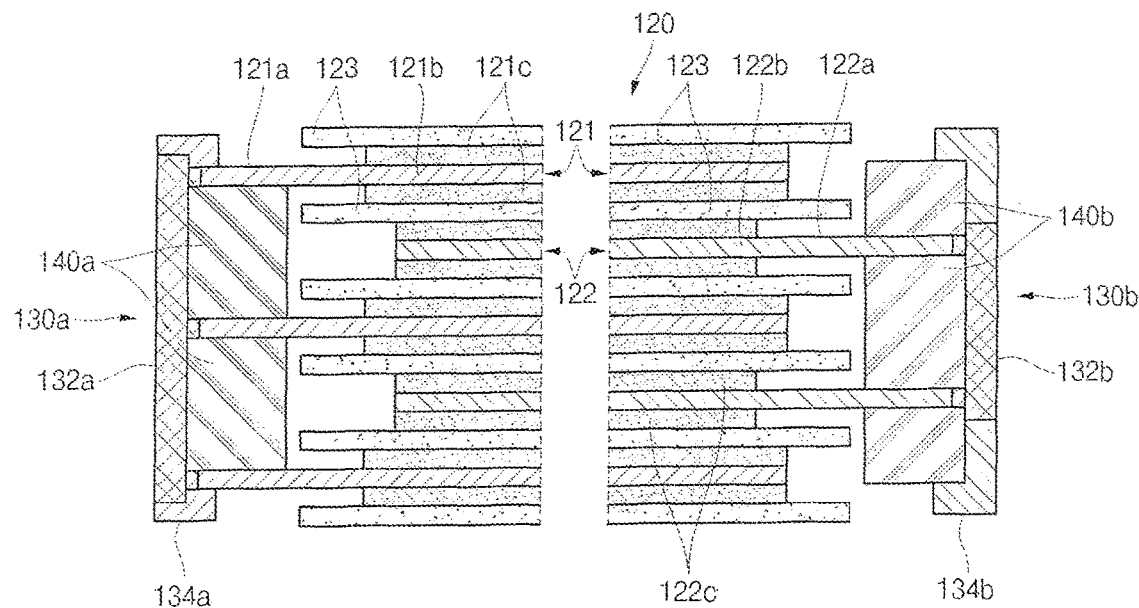
FIG. 2 is a cross-sectional view illustrating a welding structure of a collector plate and an electrode assembly of the rechargeable secondary battery of FIG. 1a, according to an embodiment of the present invention.

FIG. 1a is a perspective view of a rechargeable secondary battery according to an embodiment of the present invention; FIG. 1b is a cross-sectional view of the rechargeable secondary battery of FIG. 1a, taken along the line 1b-1b; FIG. 1c is a cross-sectional view of the rechargeable secondary battery of FIG. 1a, taken along the line 1c-1c; and FIG. 1d is a partial bottom perspective view of an inner portion including a collector plate of the rechargeable secondary battery of FIG. 1a; and FIG. 2 is a cross-sectional view illustrating a welding structure of a collector plate and an electrode assembly of the rechargeable secondary battery of FIG. 1a, according to an embodiment of the present invention.

As illustrated in FIGS. 1a to 1d and FIG. 2, a rechargeable secondary battery 100 according to the embodiment of the present invention includes a case 110, an electrode assembly 120, a first collector plate 130a, first light absorbing members 140a, a first insulation part 150a, a second collector plate 130b, second light absorbing members 140b, a second insulation part 150b, a cap plate 160, a first terminal 170a, and a second terminal 170b.

While one electrode assembly 120 is shown in FIG. 1c, embodiments of the present invention are not limited thereto. In another embodiment, for example, a rechargeable secondary battery may include more than one electrode assembly 120. In embodiments of the present invention, the case 110 may include a can, and/or may encompass the cap plate 160.

The case 110, in one embodiment, includes a pair of long side walls 111a and 111b that are substantially planar and face each other, a pair of short side walls 112a and 112b that connect the long side walls 111a and 111b and face each other, and a bottom wall 113 connecting the long side walls 111a and 111b to the short side walls 112a and 112b. Here, areas of the long side walls are larger than those of the short side walls. The case 110 may have an open top area sealed with the cap plate 160. The electrode assembly 120 and an electrolyte solution are accommodated in the case 110. The case 110, in one embodiment, may be made of a material selected from the group consisting of aluminum, an aluminum alloy, copper, a copper alloy, iron, an iron alloy, stainless steel, and equivalents thereof, but embodiments of the present invention are not limited thereto.

The electrode assembly 120 may include a pair of long side areas 120a and 120b that are substantially planar and face each other, and a pair of short side areas 120c and 120d that connect the long side areas 120a and 120b and face each other. Here, the long side areas are wider than the short side areas.

In the electrode assembly 120, in one embodiment, first non-coating portions 121a that are not coated with a first electrode active material 121c, and second non-coating portions 122a that are not coated with a second electrode active material 122c extend a length (e.g., a predetermined length) in opposite directions. That is, the first non-coating portions 121a may extend and protrude to one side by a length (e.g., a predetermined length) from the long side areas 120a and 120b and the short side areas 120c and 120d, and the second non-coating portions 122a may extend and protrude to the other side by a length (e.g., a predetermined length) from the long side areas 120a and 120b and the short side areas 120c and 120d. The first non-coating portions 121a and the second non-coating portions 122a of the electrode assembly 120 may extend a length (e.g., a predetermined length) toward the short side walls 112a and 112b of the case 110, respectively.

The electrode assembly 120 may be formed by winding or laminating a stacked structure having a first electrode plate 121, a second electrode plate 122, and a separator 123 interposed between the first and second electrode plates 121 and 122, which are formed of a thin plate or layer. The first electrode plate 121 may function as a positive electrode and the second electrode plate 122 may function as a negative electrode, or vice versa.

The first electrode plate 121 may be formed by applying the first electrode active material 121c, such as a transition metal, at a first coating portion on a first electrode collector plate 121b formed of, for example, aluminum or aluminum foil. The first electrode plate 121 includes the first non-coating portions 121a on which the first electrode active material 121c is not applied. The first non-coating portions 121a may function as passages for current flowing between the first electrode plate 121 and the outside of the first electrode plate 121. However, according to embodiments of the present invention, the material of the first electrode plate 121 is not limited to those described above.

The second electrode plate 122 may be formed by applying a second electrode active material 122c, such as graphite or carbon, at a second coating portion on a second electrode collector plate 122b formed of, for example, copper, a copper alloy, or nickel. The second electrode plate 122 may include second non-coating portions 122a on which the second electrode active material 122c is not applied. The second non-coating portions 122a may function as passages for current flowing between the second electrode plate 122 and the outside of the second electrode plate 122. However, according to embodiments of the present invention, the material of the second electrode plate 122 is not limited to those described above. Also, in other embodiments, the relative polarities of the first and second electrode plates 121 and 122 may differ from what is described above.

The separator 123 is positioned between the first electrode plate 121 and the second electrode plate 122 to prevent or substantially prevent short circuiting and to allow movement of lithium ions. The separator 123 may be formed of, for example, polyethylene, polypropylene, or a combined film of polypropylene and polyethylene. However, according to embodiments of the present invention, the material of the separator 123 is not limited to those described above.

The electrode assembly 120 and an electrolyte solution are accommodated within the case 110. The electrolyte solution may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. The electrolyte may be a liquid, a solid, or a gel.

The first light absorbing members 140a are coupled to the first non-coating portions 121a. In one embodiment, the first light absorbing members 140a are fitted into spaces between the first non-coating portions 121a. In one embodiment, the first electrode active material 121c of the first electrode plate 121, the separator 123, and the second electrode plate 122, which are positioned at one side of the first light absorbing members 140a, are not exposed to the outside. That is, the first active material 121c of the first electrode plate 121, the separator 123, and the second electrode plate 122 are separated from the first collector plate 130a by the first light absorbing members 140a. Therefore, in a laser welding process between the first collector plate 130a and the first non-coating portions 121a, which is described further below, a laser beam or spatter is not induced into the first electrode active material 121c of the first electrode plate 121, the separator 123, and the second electrode plate 122.

In one embodiment, the first light absorbing members 140a may be electrical insulators. In one embodiment, in the laser welding process described further below, the first light absorbing members 140a may have a black-series color to increase an absorption coefficient of a laser beam, but are not limited thereto.

In one embodiment, the first light absorbing members 140a may be made of a material selected from the group consisting of polypropylene (PP), polyethylene (PE), ethylene propylene diene monomer (EPDM) and equivalents thereof, but are not limited thereto. In an exemplary embodiment, a material not reacting with an electrolytic solution may be used in forming the first light absorbing members 140a.

The first collector plate 130a is positioned inside the case 110 and is electrically connected between the first terminal 170a and the electrode assembly 120. In one embodiment, the first collector plate 130a includes a substantially planar first region 131a electrically connected to the first terminal 170a, a substantially planar second region 132a bent from the first region 131a and electrically connected to the first non-coating portions 121a of the electrode assembly 120, and a bent region 133a between the first region 131a and the second region 132a. A third region 134a, which is bent from the second region 132a, may further be formed to surround an outermost first non-coating portion 121a or outermost first non-coating portions 121a at opposite sides of the electrode assembly 120.

In one embodiment, the substantially planar second region 132a of the first collector plate 130a is welded to ends in a lengthwise direction of the first non-coating portions 121a, and a widthwise direction of the second region 132a of the first collector plate 130a is substantially perpendicular to the lengthwise direction of the first non-coating portions 121a. In one embodiment, in order to prevent or substantially prevent the laser welding process performed between the second region 132a of the first collector plate 130a and the ends in the lengthwise direction of the first non-coating portions 121a from being interfered, the first light absorbing members 140a may be substantially perpendicular to the lengthwise direction of the first non-coating portions 121a.

In one embodiment, a fuse hole 135a having a substantially rectangular shape may be formed in the first region 131a of the first collector plate 130a, and a pair of fuse parts 136a, having relatively small cross-sectional areas compared to neighboring regions of the first collector plate 130a, may be at opposite sides of the fuse hole 135a. In one embodiment, widths of the fuse parts 136a may be smaller than a width of the first region 131a or the second region 132a. In the illustrated embodiment, the fuse hole 135a is formed as a through-hole in the first region 131a to form the fuse parts 136a; however, cut portions may be formed in the first region 131a to form the fuse parts 136a. The fuse parts 136a may be broken by heat generated when an external short circuit or overcharge occurs to the rechargeable secondary battery 100, thereby blocking a charge and/or discharge current. Accordingly, the safety of the rechargeable secondary battery 100 is improved.

In one embodiment, coupling holes 137a and 138a may be formed in the first region 131a of the first collector plate 130a to be coupled to a fastening region 171a of the first terminal 170a and a coupling protrusion 174a, which are described further later herein.

The first collector plate 130a may include aluminum, an aluminum alloy, titanium, stainless steel, gold, tantalum, niobium, hafnium, zirconium, vanadium, indium, cobalt, tungsten, tin, beryllium, molybdenum, and/or an alloy thereof. However, according to embodiments of the present invention, the material of the first collector plate 130a is not limited to those described above. In one embodiment, the first collector plate 130a is made of aluminum, and the fuse parts 136a are also made of aluminum. The melting point of aluminum is approximately 659° C. Thus, if the fuse parts 136a reach a temperature of approximately 659° C. due to an overcurrent, the fuse parts 136a may melt and break.

The first insulation part 150a may be constructed such that it substantially surrounds the first region 131a of the first collector plate 130a. In one embodiment, the first insulation part 150a may be positioned between the cap plate 160 and the first region 131a of the first collector plate 130a, and may surround the fastening region 171a and a flange 173a of the first terminal 170a, and the first region 131a of the first collector plate 130a. The first insulation part 150a may include an upper region 151a and approximately four side regions 152a. The upper region 151a may be interposed between the first region 131a of the first collector plate 130a and the flange 173a of the first terminal 170a, and the cap plate 160. The four side regions 152a may surround the side region of the first region 131a of the first collector plate 130a, the fastening region 171a of the first terminal 170a, and the side region of the flange 173a. The first insulation part 150a may be made of, for example, polyphenylene sulfide (PPS) (which does not react with the electrolyte solution) and/or equivalents thereof, but according to embodiments of the present invention, the material of the first insulation part 150a is not limited thereto.

The cap plate 160 may cover an open portion of the case 110 while allowing the first terminal 170a to be exposed to or to protrude to the outside. A boundary between the case 110 and the cap plate 160 may be welded by laser beam, for example. In one embodiment, an electrolyte injection hole 161 may be formed in the cap plate 160. The electrolyte injection hole 161 may be closed by a plug 162, and a safety vent 163 having a relatively small thickness may be formed in the cap plate 160. The cap plate 160 may be made of a same or substantially same material as the case 110.

The first terminal 170a is electrically connected to the first collector plate 130a and outwardly extends by a length (e.g., a predetermined length) while passing through the cap plate 160. In one embodiment, the first terminal 170a is coupled to the first region 131a of the first collector plate 130a and outwardly extends by a length (e.g., a predetermined length) while passing through the first insulation part 150a and the cap plate 160. The first terminal 170a may be electrically and mechanically coupled to the first collector plate 130a through the coupling hole 137a provided in the first region 131a of the first collector plate 130a. The first terminal 170a may include the pillar-shaped fastening region 171a, and a fixing region 172a fixed to the case 110 or the fastening region 171a outside the cap plate 160, and a bus bar (not shown) may be coupled thereto. In one embodiment, the leaf-shaped flange 173*a* horizontally extending by a length (e.g., a predetermined length) may be formed inside the case 110 or in the cap plate 160 in the fastening region 171*a*. The flange 173*a* may include a coupling protrusion 174*a* downwardly extending and coupled to the first collector plate 130*a* through the coupling hole 138*a* provided in the first region 131*a* of the first collector plate 130*a*. In one embodiment, a top surface of the flange 173*a* may make close contact with the upper region 151*a* of the first insulation part 150*a*. In one embodiment, the fuse parts 136*a* and the bent region 133*a* of the first collector plate 130*a* may be received in a space formed by the side regions 152*a* of the first insulation part 150*a*.

The fastening region 171*a*, the fixing region 172*a*, the flange 173*a*, and the coupling protrusion 174*a*, forming the first terminal 170*a*, may include a material selected from the group consisting of aluminum, an aluminum alloy, and/or equivalents thereof, but, according to embodiments of the present invention, the materials of the fastening region 171*a*, the fixing region 172*a*, the flange 173*a*, and the coupling protrusion 174*a* are not limited to those described above.

In one embodiment, the fastening region 171*a* positioned on the cap plate 160 may be coupled to the fixing region 172*a* to be riveted or welded, and the fastening region 171*a* and the coupling protrusion 174*a* positioned under the cap plate 160 may be coupled to the first collector plate 130*a* through the coupling holes 137*a* and 138*a* provided in the first region 131*a* of the first collector plate 130*a* to be riveted or welded.

The fastening region 171*a* of the first terminal 170*a* may pass through the cap plate 160, and a seal gasket 181*a* may further be formed on the outer circumference thereof, such that the first terminal 170*a* may be insulated from the cap plate 160. In one embodiment, the seal gasket 181*a* may be made of polyphenylene sulfide (PPS) (which does not react with the electrolyte solution), but, according to embodiments of the present invention, the material of the seal gasket 181*a* is not limited thereto.

An upper insulation part 182*a* may be provided between the fixing region 172*a* and the cap plate 160. In one embodiment, the upper insulation part 182*a* may make close contact with the seal gasket 181*a*. The upper insulation part 182*a* insulates the first fixing region 172*a* from the cap plate 160. In one embodiment, the upper insulation part 182*a* may be made of polyphenylene sulfide (PPS), but, according to embodiments of the present invention, the material of the upper insulation part 182*a* is not limited thereto. In one embodiment, the case 110 and the cap plate 160 may be charged as a positive electrode, and the fixing region 172*a* and the cap plate 160 may be electrically connected to each other by a high-resistance member (not shown).

The second collector plate 130*b*, the second light absorbing members 140*b*, and the second terminal 170*b* may be the same or substantially the same as the respective first collector plate 130*a*, first light absorbing members 140*a*, and first terminal 170*a*. In one embodiment, a fuse hole 135*b* and a fuse part 136*b* may be provided in the second collector plate 130*b*. In another embodiment, however, the fuse hole 135*b* and the fuse part 136*b* may not be provided in the second collector plate 130*b*.

In one embodiment, the second light absorbing members 140*b* are coupled to the second non-coating portions 122*a*. In one embodiment, the second light absorbing members 140*b* are fitted into spaces formed by the second non-coating portions 122*a*, such that the second active material 122*c* of the second electrode plate 122, the separator 123, and the first electrode plate 121, which are positioned at one side of the second light absorbing members 140*b*, are not exposed to the outside. That is, the second active material 122*c* of the second electrode plate 122, the separator 123, and the first electrode plate 121 are separated from the second collector plate 130*b* by the second light absorbing members 140*b*. Therefore, in a laser welding process between the second collector plate 130*b* and the second non-coating portions 122*a*, which will be described further below, a laser beam or spatter is not induced into the second active material 122*c* of the second electrode plate 122, the separator 123, and the first electrode plate 121.

The first light absorbing members 140*a* and the second light absorbing members 140*b* may extend by a length (e.g., a predetermined length) in opposite directions. That is, the first light absorbing members 140*a* extend by a length (e.g., a predetermined length) to one side through the long side areas 120*a* and 120*b* and the short side areas 120*c* and 120*d* of the electrode assembly 120, and the second light absorbing members 140*b* extend by a length (e.g., a predetermined length) to the other side through the long side areas 120*a* and 120*b* and the short side areas 120*c* and 120*d* of the electrode assembly 120. In addition, the first light absorbing members 140*a* and the second light absorbing members 140*b* extend by a length (e.g., a predetermined length) toward the short side walls 112*a* and 112*b* of the case 110.

As illustrated in FIG. 2, one or more of the light absorbing members 140*a* and 140*b* may be positioned at an outer side of the active material non-coating portions 121*a* and 122*a* at the outermost regions of the electrode assembly 120 (see the right side region of FIG. 2) or may not be positioned at an outer side of the active material non-coating portions 121*a* and 122*a* at the outermost regions of the electrode assembly 120 (see the left side region of FIG. 2). The outermost light absorbing members 140*a* and 140*b* may be provided according to sizes or designs of the collector plates 130*a* and 130*b*, but aspects of the present invention are not limited thereto.

Since, in one embodiment, the first collector plate 130*a* and the second collector plate 130*b*, and the first light absorbing members 140*a* and the second light absorbing members 140*b* have the same or substantially the same configurations, respectively, the description below focuses on the first collector plate 130*a* and the first light absorbing members 140*a* but may also be applied to the second collector plate 130*b* and the second light absorbing members 140*b*.

Figure 3:
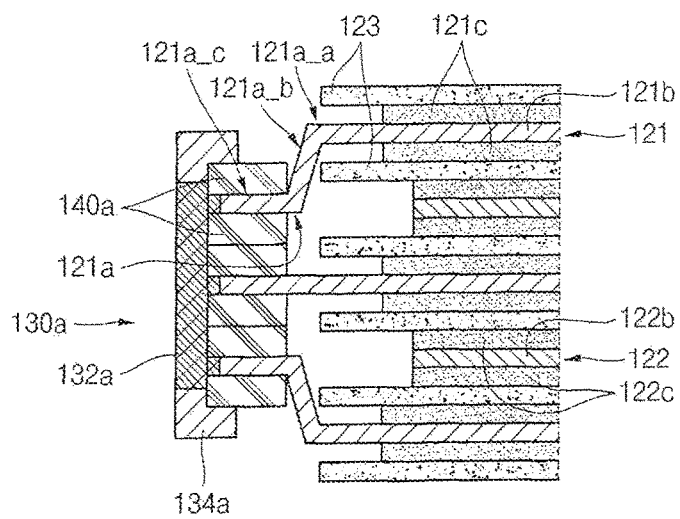
FIG. 3 is a cross-sectional view illustrating a welding structure of a collector plate and an electrode assembly of a rechargeable secondary battery, according to another embodiment of the present invention.

FIG. 3 is a cross-sectional view illustrating a welding structure of a collector plate and an electrode assembly of a rechargeable secondary battery, according to another embodiment of the present invention.

In another embodiment of the present invention, as illustrated in FIG. 3, each of the first non-coating portions 121*a* includes a first region 121*a_a* substantially parallel to a lengthwise direction of the first coating portion 121*c*, a second region 121*a_c* substantially perpendicular to a widthwise direction of the first collector plate 130*a*, and a bent region 121*a_b* formed between the first region 121*a_a* and the second region 121*a_c*. In one embodiment, for example, a second electrode plate 122 and two separators 123 are interposed between two first electrode plates 121 stacked one on the other. Thus, even though the first light absorbing members 140*a* are interposed between the two first non-coating portions 121*a* stacked one on the other, a thickness formed by the two first non-coating portions 121*a* may be smaller than the overall thickness of the electrode assembly 120. As illustrated in FIG. 3, the first non-coating portions 121*a* and the first light absorbing members 140*a* are pressed, and a thickness formed by the first non-coating portions 121a and the first light absorbing members 140a may be smaller than the overall thickness of the electrode assembly 120. Accordingly, a first collector plate 130a may be designed such that a width of the first collector plate 130a is smaller than the overall thickness of the electrode assembly 120.

Figure 4:
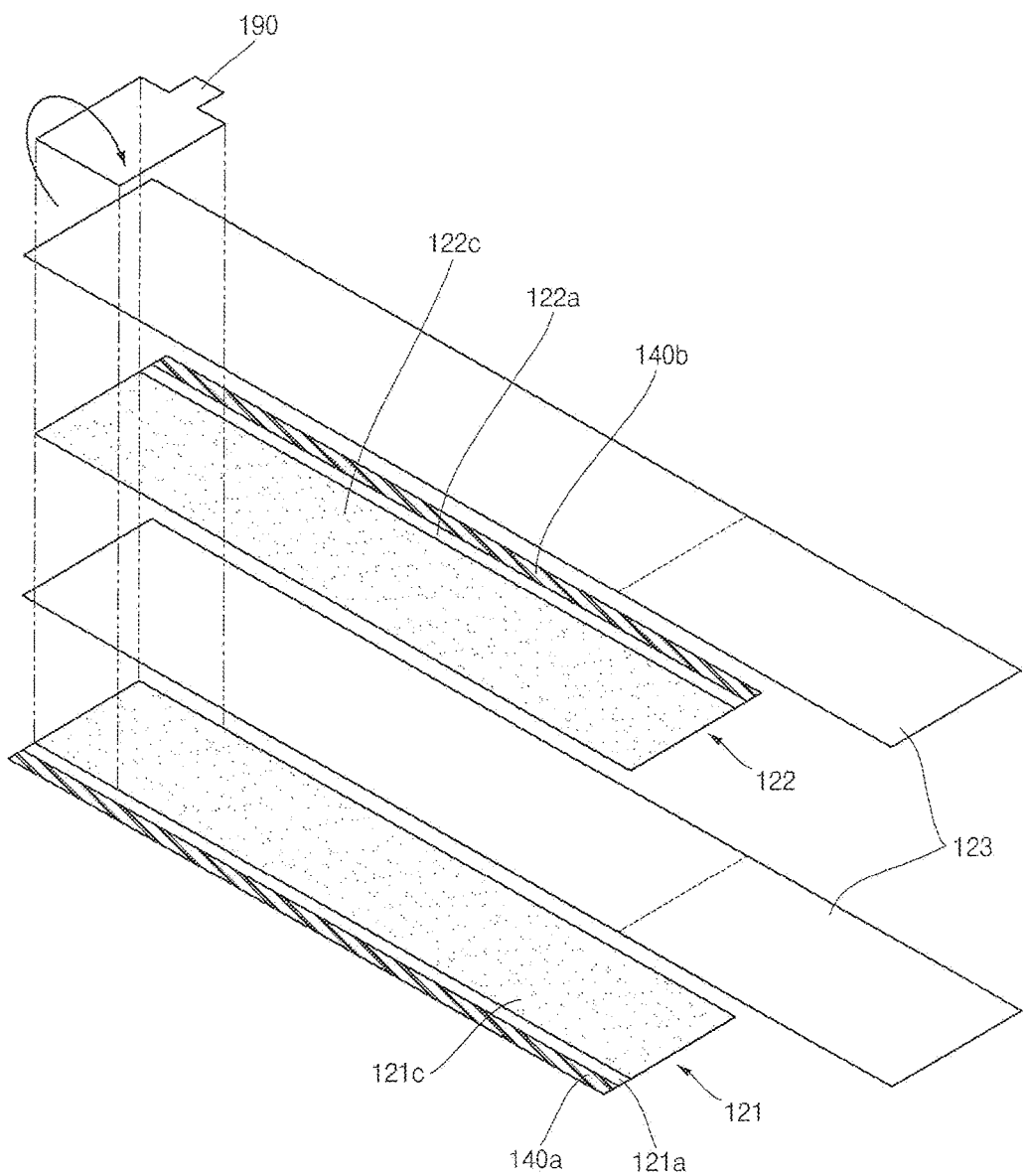
FIG. 4 is a schematic perspective view illustrating a winding method of an electrode assembly of a rechargeable secondary battery, according to an embodiment of the present invention.

FIG. 4 is a schematic perspective view illustrating a winding method of an electrode assembly of a rechargeable secondary battery, according to an embodiment of the present invention.

As illustrated in FIG. 4, in a manufacturing method of the rechargeable secondary battery 100 according to an embodiment of the present invention, the rechargeable secondary battery 100 includes a first electrode plate 121, a second electrode plate 122, and two separators 123.

In one embodiment, the first electrode plate 121 includes the first coating portion having the first electrode active material 121c and the first non-coating portions 121a, and the first light absorbing members 140a are positioned on or attached to top surfaces and/or bottom surfaces of the first non-coating portions 121a. In one embodiment, a width of each of the first light absorbing members 140a may be equal to or smaller than a width of each of the first non-coating portions 121a. In order to facilitate welding of the first collector plate 130a, ends of the first non-coating portions 121a are exposed to the outside through the first light absorbing members 140a.

In addition, in one embodiment, the second electrode plate 122 includes a second coating portion having the second electrode active material 122c and the second non-coating portions 122a, and the second light absorbing members 140b are positioned on or attached to top surfaces and/or bottom surfaces of the second non-coating portions 122a. In one embodiment, a width of each of the second light absorbing members 140b may be equal to or smaller than a width of each of the second non-coating portions 122a. In order to facilitate welding of the second collector plate 130b, ends of the second non-coating portions 122a are exposed to the outside through the second light absorbing members 140b.

In one embodiment, two separators 123 positioned on the top and bottom surfaces of the second electrode plate 122 are longer than the first and second electrode plates 121 and 122, such that the outermost part of the electrode assembly 120 is surrounded by the separators 123, thereby improving the safety of the rechargeable secondary battery 100.

Lastly, a winder 190 makes close contact with a top end of the electrode assembly 120 and rotates in a clockwise direction, for example, thereby obtaining the electrode assembly 120 shown in FIG. 2.

FIGS. 5a to 5d are cross-sectional views illustrating a welding method of a collector plate and an electrode assembly of a rechargeable secondary battery, according to an embodiment of the present invention.

Figure 5A:
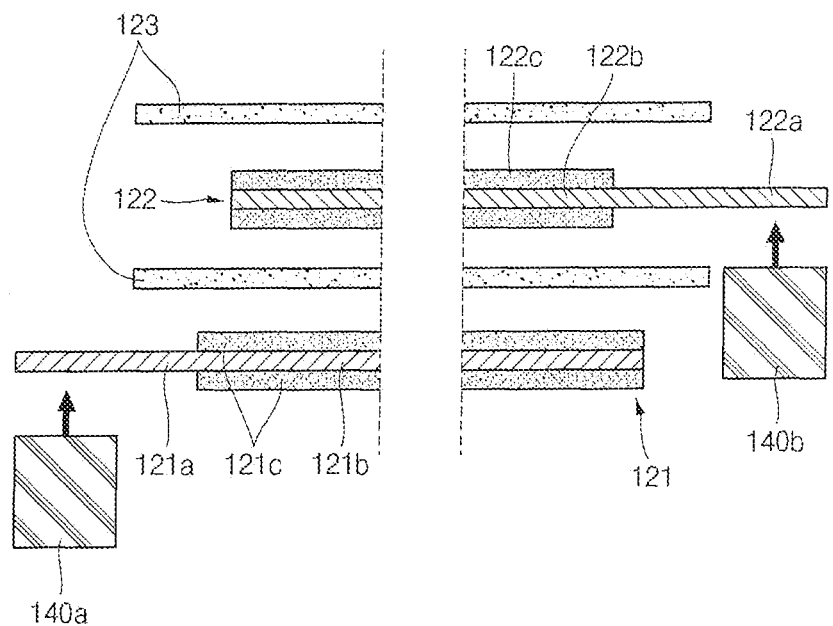
FIGS. 5a to 5d are cross-sectional views illustrating a welding method of a collector plate and an electrode assembly of a rechargeable secondary battery, according to an embodiment of the present invention.

As illustrated in FIG. 5a, in one embodiment, before the electrode assembly 120 is wound, the first light absorbing members 140a may be positioned on the bottom surfaces of the first non-coating portions 121a, and the second light absorbing members 140b may be positioned on the bottom surfaces of the second non-coating portions 122a. Alternatively, before the electrode assembly 120 is wound, the first light absorbing members 140a may be positioned on the top surfaces of the first non-coating portions 121a, and the second light absorbing members 140b may be positioned on the top surfaces of the second non-coating portions 122a.

In another embodiment, before the electrode assembly 120 is wound, the first light absorbing members 140a may be positioned on the top and bottom surfaces of the first non-coating portions 121a, and the second light absorbing members 140b may be positioned on the top and bottom surfaces of the second non-coating portions 122a.

Figure 5B:
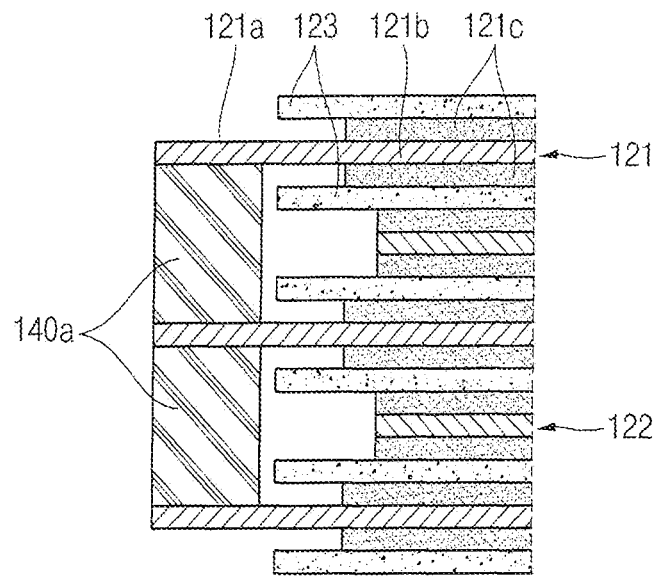

As illustrated in FIG. 5b, after the electrode assembly 120 is wound, the first light absorbing members 140a may be interposed between two first non-coating portions 121a, for example. The ends of the first non-coating portions 121a are exposed to the outside through the first light absorbing members 140a. In addition, the first coating portion having the first electrode active material 121c of the first electrode plate 121, the separators 123, and the second electrode plate 122 are not exposed to the outside through the first light absorbing members 140a.

Figure 5C:
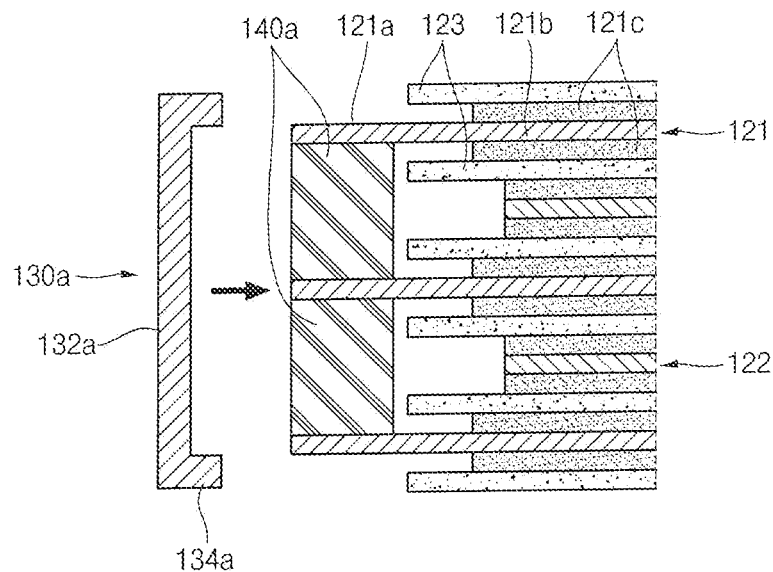

As illustrated in FIG. 5c, after the electrode assembly 120 is wound, the first collector plate 130a is coupled to the first non-coating portions 121a. In one embodiment, the substantially planar second region 132a makes close contact with the first non-coating portions 121a and the first light absorbing members 140a, the second region 132a having a substantially perpendicular width with respect to a lengthwise direction of the first non-coating portions 121a of the first collector plate 130a. In addition, in one embodiment, the third region 134a of the first collector plate 130a may make close contact with the outermost first non-coating portions 121a.

Figure 5D:
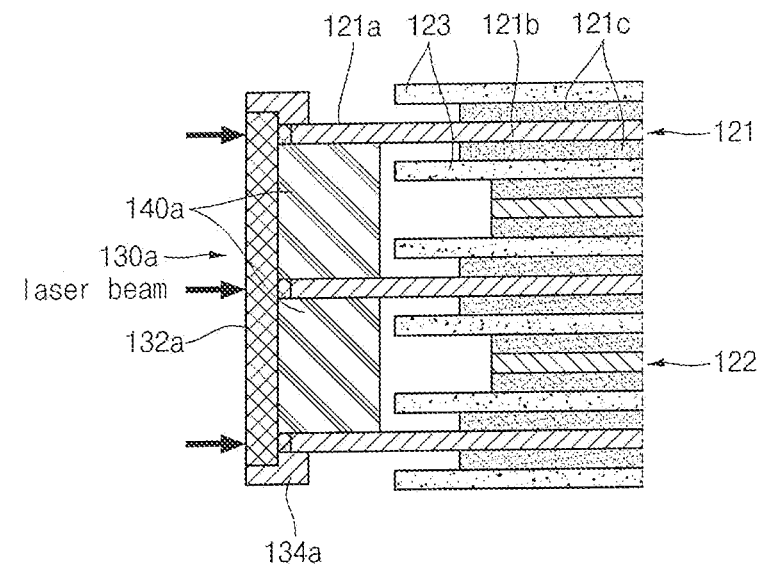

As illustrated in FIG. 5d, a laser beam is incident into the planar second region 132a of the first collector plate 130a. The incident direction of the laser beam is substantially parallel to the lengthwise direction of the electrode assembly 120. Therefore, while the planar second region 132a of the first collector plate 130a and the ends of the first non-coating portions 121a are melted and cooled, they are welded to each other. Even if the laser beam passes through the planar second region 132a of the first collector plate 130a, the first light absorbing members 140a absorb the laser beam, thereby preventing or substantially preventing the laser beam and/or spatter from being incident into the first coating portion having the first electrode active material 121c of the first electrode plate 121, the separators 123, and the second electrode plate 122.

Therefore, the separators 123 and/or the first and second electrode plates 121 and 122 can be prevented from being damaged, and the first and second electrode plates 121 and 122 can be prevented from being internally short circuited.

In addition, since the welding using a laser beam is performed in a substantially parallel direction with respect to a lengthwise direction of the electrode assembly 120, rather than in a direction perpendicular to the lengthwise direction of the electrode assembly 120, an internal margin (that is, an area of the first coating portion having the first electrode active material 121c) of the electrode assembly 120 can be maximized or increased, the design of the first collector plate 130a can be simplified, and the number of manufacturing process steps can be reduced.

FIGS. 6a to 6d are cross-sectional views illustrating a welding method of a collector plate and an electrode assembly of a rechargeable secondary battery, according to another embodiment of the present invention.

Figure 6A:
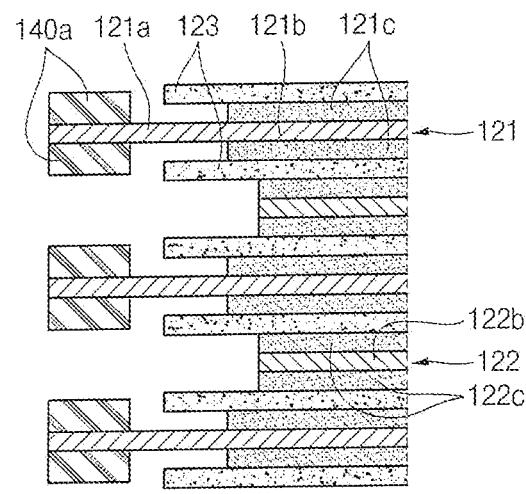
FIGS. 6a to 6d are cross-sectional views illustrating a welding method of a collector plate and an electrode assembly of a rechargeable secondary battery, according to another embodiment of the present invention.

As illustrated in FIG. 6a, a thickness of each of first light absorbing members 140a may be similar to a thickness of the first electrode plate 121 or the second electrode plate 122. In addition, the thickness of each of the first light absorbing members 140a may be similar to a thickness of each of the separators 123. Further, the first light absorbing members 140a may be positioned on top surfaces and/or bottom surfaces of the first non-coating portions 121a.

In such a manner, before the first non-coating portions 121a are bent, the first light absorbing members 140a adjacent to each other may be spaced apart from each other without making contact with each other.

Figure 6B:
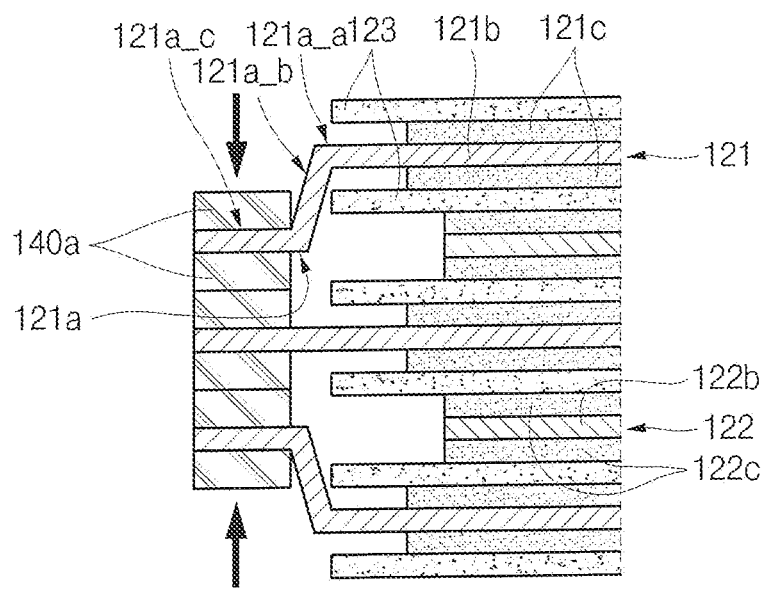

As illustrated in FIG. 6b, a distance between the first non-coating portions 121a is minimized or reduced by pressing the first non-coating portions 121a. Accordingly, the adjacent first light absorbing members 140a may make close contact with each other. As a result of the pressing, the overall thickness of the first non-coating portions 121a becomes smaller than the overall thickness of the electrode assembly 120.

Figure 6C:
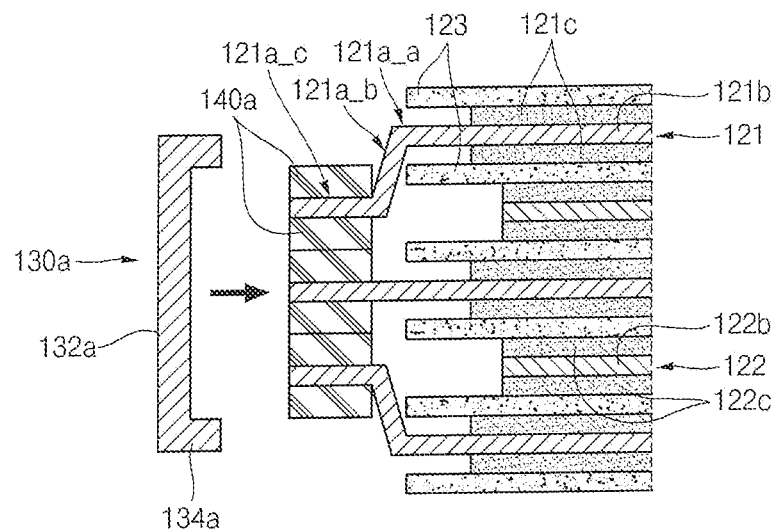

As illustrated in FIG. 6c, the first collector plate 130a is coupled to the compressed first non-coating portions 121a. The planar second region 132a of the first collector plate 130a makes contact with ends of the first non-coating portions 121a, and, in one embodiment, the third region 134a makes close contact with the outermost first non-coating portions 121a or the outermost first light absorbing members 140a.

Figure 6D:
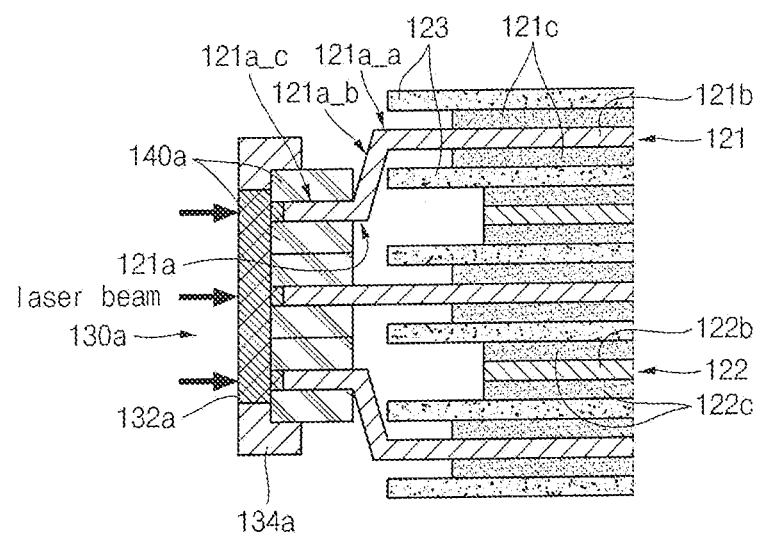

As illustrated in FIG. 6d, a laser beam is incident into the second region 132a of the first collector plate 130a. That is, the laser beam is incident in the substantially parallel direction with respect to the lengthwise direction of the electrode assembly 120. Therefore, the second region 132a of the first collector plate 130a and the first non-coating portions 121a are melted and cooled, and are electrically connected to each other.

The first light absorbing members 140a prevent or substantially prevent the laser beam and/or spatter from being induced into the first coating portion having the first electrode active material 121c of the first electrode plate 121, the separators 123, and the second electrode plate 122, thereby preventing the first and second electrode plates 121 and 122 and the separators 123 from being damaged and preventing the first and second electrode plates 121 and 122 from being internally short circuited. In addition, an overall thickness formed by the first non-coating portions 121a and the first light absorbing members 140a is minimized or reduced by a pressing process of the first non-coating portions 121a, thereby minimizing or reducing a width of the first collector plate 130a, that is, the planar second region 132a.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable secondary battery comprising:
a case;
an electrode assembly accommodated in the case, the electrode assembly comprising active material coating portions, the electrode assembly further comprising active material non-coating portions extending at an end of the electrode assembly in a lengthwise direction of the electrode assembly;
a light absorbing member coupled to the electrode assembly and positioned between the active material non-coating portions in a direction perpendicular to the lengthwise direction; and
a collector plate welded to the electrode assembly and contacting the active material non-coating portions.

2. The rechargeable secondary battery of claim 1, wherein the collector plate contacts the light absorbing member.

3. The rechargeable secondary battery of claim 1, wherein the light absorbing member comprises an electrical insulator.

4. The rechargeable secondary battery of claim 1, wherein a color of the light absorbing member is black.

5. The rechargeable secondary battery of claim 1, wherein the light absorbing member comprises a material selected from the group consisting of polypropylene (PP), polyethylene (PE), and ethylene propylene diene monomer (EPDM).

6. The rechargeable secondary battery of claim 1, wherein the collector plate is welded to the active material non-coating portions, and the light absorbing member is coupled to the active material non-coating portions.

7. The rechargeable secondary battery of claim 6, wherein the collector plate is welded to the end in the lengthwise direction, and the light absorbing member is positioned on a side of an active material non-coating portion of the active material non-coating portions in the direction perpendicular to the lengthwise direction.

8. The rechargeable secondary battery of claim 7, wherein the light absorbing member comprises a first light absorbing member positioned on the side of the active material non-coating portion, and a second light absorbing member positioned on another side of the active material non-coating portion opposite the side of the active material non-coating portion.

9. The rechargeable secondary battery of claim 7, wherein the light absorbing member is positioned at an outermost region of the electrode assembly on the side of the active material non-coating portion.

10. The rechargeable secondary battery of claim 1, wherein the light absorbing member is positioned between the active material coating portions and the collector plate.

11. The rechargeable secondary battery of claim 10, wherein the active material non-coating portions and the light absorbing member together fill a space between the active material coating portions and the collector plate.

12. The rechargeable secondary battery of claim 1, wherein the electrode assembly further comprises a separator contacting the active material coating portions, and the light absorbing member is positioned between the separator and the collector plate.

13. The rechargeable secondary battery of claim 1, further comprising a terminal connected to the collector plate and extending outside of the case, wherein the collector plate includes a first region connected to the terminal, a second region extending from the first region and welded to the end in the lengthwise direction, and a bent region formed between the first region and the second region.

14. The rechargeable secondary battery of claim 1, wherein an active material non-coating portion of the active material non-coating portions includes a first region parallel to the lengthwise direction, a second region perpendicular to a widthwise direction of the collector plate, and a bent region between the first region and the second region.

15. The rechargeable secondary battery of claim 1, wherein a thickness of the active material non-coating portions and the light absorbing member is less than an overall thickness of the electrode assembly.

16. The rechargeable secondary battery of claim 1, wherein the collector plate has a width extending perpendicular to the lengthwise direction of the electrode assembly, and the collector plate is welded to the electrode assembly and contacts the light absorbing member across the width.

17. The rechargeable secondary battery of claim 1,
wherein the electrode assembly comprises: a first electrode plate including a first coating portion and a first non-coating portion; a second electrode plate including a second coating portion and a second non-coating portion; and a separator between the first and second electrode plates, and
wherein the light absorbing member comprises: a first light absorbing member coupled to the first non-coating portion; and a second light absorbing member coupled to the second non-coating portion.

18. The rechargeable secondary battery of claim 17, wherein the collector plate and the first non-coating portion are laser-welded to each other at a laser-welded portion, and the first light absorbing member defines a barrier between the laser-welded portion and each of the first coating portion of the first electrode plate, the second coating portion of the second electrode plate, and the separator.

19. The rechargeable secondary battery of claim 17, wherein the collector plate and the second non-coating portion are laser-welded to each other at a laser-welded portion, and the second light absorbing member defines a barrier between the laser-welded portion and each of the first coating portion of the first electrode plate, the second coating portion of the second electrode plate, and the separator.

20. The rechargeable secondary battery of claim 1, wherein the collector plate is laser welded to end portions of the electrode assembly in the lengthwise direction of the electrode assembly.

* * * * *